ико

United States Patent
Bose et al.

(10) Patent No.: US 8,001,394 B2
(45) Date of Patent: Aug. 16, 2011

(54) METHOD AND SYSTEM OF MULTI-CORE MICROPROCESSOR POWER MANAGEMENT AND CONTROL VIA PER-CHIPLET, PROGRAMMABLE POWER MODES

(75) Inventors: Pradip Bose, Yorktown Heights, NY (US); Alper Buyuktosunoglu, White Plains, NY (US); Michael Stephen Floyd, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 12/023,536

(22) Filed: Jan. 31, 2008

(65) Prior Publication Data

US 2009/0199020 A1    Aug. 6, 2009

(51) Int. Cl.
*G06F 1/26* (2006.01)
*G06F 1/32* (2006.01)

(52) U.S. Cl. ........ 713/300; 713/310; 713/320; 716/120; 716/129

(58) Field of Classification Search .................. 713/300, 713/310, 320; 716/120, 129
See application file for complete search history.

(56) References Cited

U.S. PATENT DOCUMENTS

| | | | |
|---|---|---|---|
| 6,523,150 B1 | 2/2003 | Buffet et al. | |
| 6,665,843 B2 | 12/2003 | Frech et al. | |
| 6,883,152 B2 | 4/2005 | Bednar et al. | |
| 6,976,235 B2 | 12/2005 | Bobba et al. | |
| 6,990,645 B2 | 1/2006 | Lichtensteiger et al. | |
| 2007/0138653 A1 | 6/2007 | Bartley et al. | |
| 2007/0198863 A1* | 8/2007 | Bose et al. | 713/300 |
| 2008/0034244 A1* | 2/2008 | Allen | 713/340 |

* cited by examiner

*Primary Examiner* — Thomas Lee
*Assistant Examiner* — Michael J Brown
(74) *Attorney, Agent, or Firm* — Yee & Associates, P.C.; Matthew W. Baca (57) ABSTRACT

A computer-implemented method and a system for managing power in a multi-core microprocessor are provided. A power management control microarchitecture in a chiplet translates a first command comprising a power setting. A chiplet comprises a processor core and associated memory cache. The power management control microarchitecture comprises power mode registers, power mode adjusters, translators, and microarchitectural power management techniques. The power management control microarchitecture sets microarchitectural power management techniques according to the power setting. The global power management controller issues the first command. The global power management controller may reside either on or off of the microprocessor. The global power management controller issues commands either directly for a specific chiplet out of the plurality of chiplets or to the plurality of chiplets and the control slave bus translates the command into sub-commands dedicated to specific chiplets within the plurality of chiplets. Each chiplet may be set to separate power levels.

16 Claims, 9 Drawing Sheets

METHOD AND SYSTEM OF MULTI-CORE MICROPROCESSOR POWER MANAGEMENT AND CONTROL VIA PER-CHIPLET, PROGRAMMABLE POWER MODES

This invention was made with United States Government support under Agreement No. HR0011-07-9-0002 awarded by DARPA. THE GOVERNMENT HAS CERTAIN RIGHTS IN THE INVENTION.

BACKGROUND

1. Field of the Invention

The present application relates generally to microprocessors. More specifically, the present application provides for a method and system of power management of multi-core microprocessors.

2. Description of the Related Art

As multi-core processors become more commonplace, power management issues become more important. In a design era in which "green computing" is of ever-increasing importance, system- or datacenter-level power management and control, requires effective, programmable power management accessibility across computing elements within each microprocessor chip. In addition to providing large, efficient power reduction capability via dynamic voltage and frequency control, there is a need to provide smaller degrees of power reduction (when needed) at minimal complexity and performance overhead. The current generation of multi-core microprocessor chips does not provide such fine-grain, global, multi-core power management accessibility.

Prior known approaches are limited to point solutions incorporating particular power-saving mechanisms for a given core or non-core component within a microprocessor chip. Local conditions, such as temperature or region-specific workload variations, trigger individual power-saving mechanisms and are not amenable to effective global control and optimization via an on- or off-chip system power manager.

Hence, there is a need in the art for providing such an effective power management capability in future multi- and many-core microprocessor chips.

SUMMARY

Exemplary embodiments provide a computer-implemented method and a system for managing power in a multi-core microprocessor. A power management system for managing and controlling power on a microarchitectural level translates a first command. The command comprises a power setting. The power management system sets microarchitectural power management techniques according to the power setting.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE PREFERRED EMBODIMENT

Figure 1:
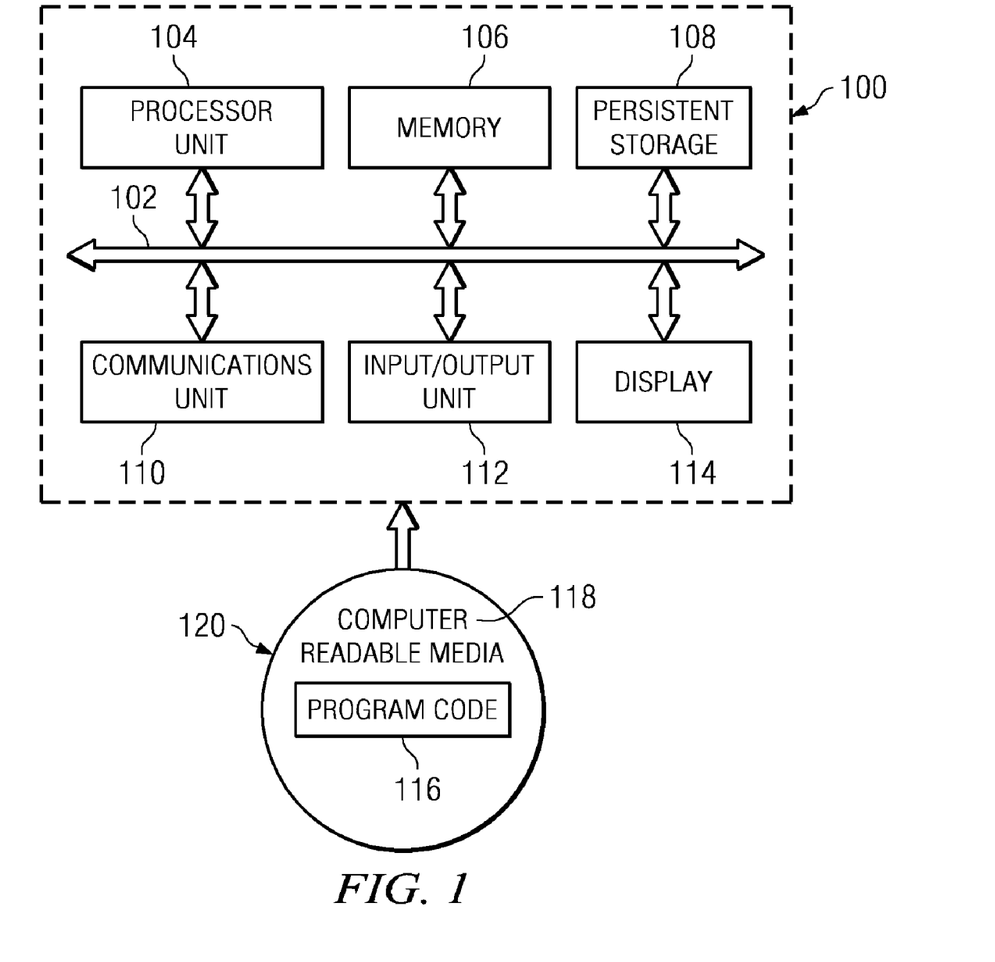
FIG. 1 is a block diagram of a data processing system in accordance with an illustrative embodiment of the present invention.

Turning now to FIG. 1, a block diagram of a data processing system is depicted in accordance with an illustrative embodiment of the present invention. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications using either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer-implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108, and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Exemplary embodiments provide for a method and system for managing power in a multi-core processor environment. Multi-core processors refer to a central processing unit that includes multiple complete execution cores per physical processor. The central processing unit combines multiple processors and their caches and cache controllers onto a single integrated circuit (silicon chip). Multi-core processors are well suited for multitasking environments because there are multiple complete execution cores instead of one, each with an independent interface to the front side bus. Since each core has its own cache, the operating system has sufficient resources to handle most compute intensive tasks in parallel.

Exemplary embodiments enable placing each core within a multi-core microprocessor chip specific and possibly different operational modes, each mode with pre-defined power and performance characteristics, such that the overall chip power consumption falls within specified limits, as dictated by a chip-wide global controller, while not violating specified performance degradation limits. In particular, exemplary embodiments describe a systematic methodology with associated system embodiments for designing a discrete set of power modes for each chiplet, which is a processor core plus some memory cache, which a global controller may use to effect programmable power management and control functions. The global controller may reside either on or off the microprocessor chip.

Turning back to FIG. 2, a block diagram of a system wherein power management control microarchitecture may be implemented is shown in accordance with an illustrative embodiment. System 200 comprises microprocessor 202 and global power management controller 204. Microprocessor 202 may be implemented as processor unit 104 in FIG. 1. Global power management controller 204 is a global, system-level power management controller.

Figure 2:
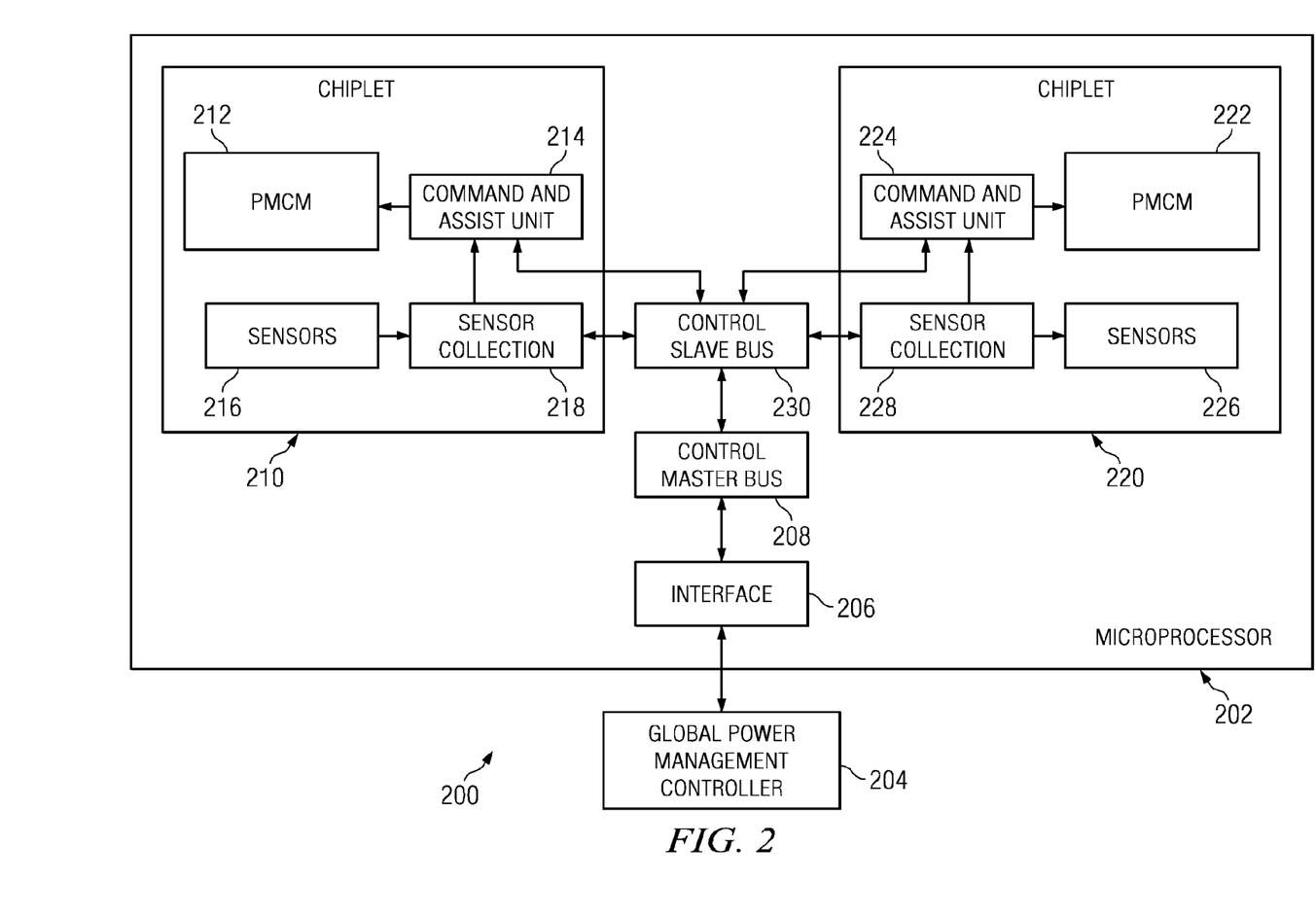
FIG. 2 is a block diagram of a system wherein power management control microarchitecture may be implemented in accordance with an illustrative embodiment.

Microprocessor 202 comprises interface 206, control master bus 208, control slave bus 230, and chiplets 210 and 220. A chiplet is a processor core plus some memory cache, a L1, L2, L3, or L4 memory cache or some combination thereof. A control slave bus is a slave bus that is part of a global power management system and facilitates communication between the control master bus and the command and assist unit in each core of a multi-core microprocessor. A slave bus is a bus that is controlled by another bus, referred to as the master bus. A control master bus is a master bus that is part of a global power management system and passes commands issued from a global power management controller and formatted through an interface to any of a number of control slave busses for forwarding onto individual chiplets. A master bus is a bus that controls other busses, called slave busses.

Chiplet 210 comprises power management control microarchitecture PMCM 212, command and assist unit 214, sensors 216, and sensor collection 218. Chiplet 220 comprises power management control microarchitecture PMCM 222, command and assist unit 224, sensors 226, and sensor collection 228.

In addition to providing large, efficient power reduction capability via dynamic voltage and frequency scaling; there is a need to provide smaller degrees of power and performance tradeoff capability. Power management and control microarchitecture provides such fine-grain, global, multi-core power and performance tradeoff capability by exploiting microarchitectural power management techniques. Power management and control microarchitecture is a power management system for managing and controlling power on a microarchitectural level. In computer engineering, microarchitecture (sometimes abbreviated to μarch or uarch) is a description of the electrical circuitry of a computer, central processing unit, or digital signal processor that is sufficient for completely describing the operation of the hardware.

Prior known techniques are limited to point solutions incorporating particular power saving mechanisms in a core or non-core component within a microprocessor chip. Local conditions, such as temperature or region-specific workload variations, trigger individual power-saving mechanisms. On the other hand, power management and control microarchitecture is amenable to effective global control and optimization via an on- or off-chip system power manager. Power management and control microarchitecture comprises the following components: power mode registers, translators, power adjusters, and microarchitectural power management techniques.

Power mode register refers to a set of registers in the core dedicated to assigning power levels. The power mode registers set, or determine, the power saving aggressiveness level. A power mode register operates in a number of modes equal to two to the power of the number of bits of the register. Thus, a power mode register with two bits can operate in four power modes. For example, if the power mode register is two bits, the definition of power saving aggressiveness can be:

None: max performance—No power savings
Low: Negligible performance loss across workloads—Low power savings
Medium: Some measurable performance loss—Medium power savings
High: Large performance loss possible—High, Large potential power savings Power mode adjuster refers to a set of registers in the core dedicated to adjusting the power levels in the power mode registers. A power mode adjuster may be set to function in a per power mode. A per power mode means the power mode adjuster is applied to every power mode of the power mode register. In an alternate embodiment, the power mode adjuster applies itself only for particular power modes.

Translators are multiplexers. A multiplexer, or mux, is a device for combining several signals into a single composite signal. A translator acts to combine a signal from the power mode adjuster with a signal from a power mode register and provide a single input to the microarchitecture technique. The microarchitecture technique acts upon this received command. More specifically, a translator translates the power saving aggressiveness level (a signal from power mode register) into a definition at which specific microarchitectural power management technique will be functional.

For example, in the case of a microarchitectural power management technique such as instruction fetch throttling with four distinct levels of power saving aggressiveness (none, low, medium, high), the aggressiveness level of "low" can be defined in multiple ways such as "block instruction fetch 10 percent of the execution time" or "block instruction fetch 20 percent of the execution time" and so forth. In this specific example, a power mode adjuster combined with a translator will define exactly what that low definition will be. In a typical operation, each power saving aggressiveness level has its own power mode adjuster. In other words, medium and high power aggressiveness level will have separate power mode adjuster that defines what medium and high definitions will be.

Microarchitectural power management techniques provide a user an opportunity to trade power for performance. The microarchitectural power management techniques also allow a user to control energy and power wasted speculatively at the expense of performance. In an exemplary embodiment, the microarchitectural power management techniques are not voltage or frequency scaling. Some examples of these microarchitectural power management techniques are: instruction fetch throttling, choosing how deep to prefetch, disabling speculation, power-efficient thread prioritization in a simultaneous multi-threaded processor, disabling bypass paths between instruction dispatch and issue, disabling issue of certain type of instructions to certain type of functional units, reducing execution modes such as reducing number of instructions that can be dispatched or committed, in-order issuing versus out-of-order issuing, reducing load miss speculation, and so forth. In an alternate embodiment, the microarchitectural power management techniques encompass techniques that are frequency and voltage scaling.

The present exemplary embodiment depicts global power management controller 204 as being located off microprocessor 202. In an alternative exemplary embodiment, global power management controller 204 is located on microprocessor 202. Further, while FIG. 2 shows microprocessor 202 as comprising two (2) chiplets, alternate exemplary embodiments contemplate microprocessor 202 comprising any number of chiplets, from one to several.

Interface 206 facilitates communication between global power management controller 204 and control master bus 208. Interface 206 provides data formatting and bus protocols for the communications between global power management controller 204 and control master bus 208. System 200 shows control master bus 208 connected to a single control slave bus 230. However, control master bus 208 connects to many different control slave busses, which are not shown in FIG. 2.

Global power management controller 204 passes commands through interface 206 to control master bus 208, who passes the information on to control slave bus 230, which then distributes the commands to the chiplets. Control slave bus 230 passes commands to command and assist units 214 and 224, which then instruct PMCMs 212 and 222, respectively, how to function. PMCMs 212 and 222 set microarchitectural power management techniques according to the commands received from the command and assist unit.

Sensors 216 and 226 monitor PMCMs 212 and 222, respectively, and report to sensor collections 218 and 228, respectively. Sensors 216 and 226 comprise a set of one or more sensors that monitor PMCMs 212 and 222 for various performance information, such as, but not limited to, instructions committed per cycle, temperature, power consumption, throughput, frequency, voltage, and so forth. Sensors 216 and 226 pass this information to the sensor collections 218 and 228, which then distribute the data to the command and assist units 214 and 224 and the control slave bus 230, as appropriate.

Performance information fed to command and assist units 214 and 224, by sensors collections 218 and 228 allow command and assist units 214 and 224 to override the settings PMCMs 212 and 222 in special or emergency circumstances. Sensor collections 218 and 228 send some performance data directly to control slave bus 230 for eventual transmission to global power management controller 204.

Figure 3:
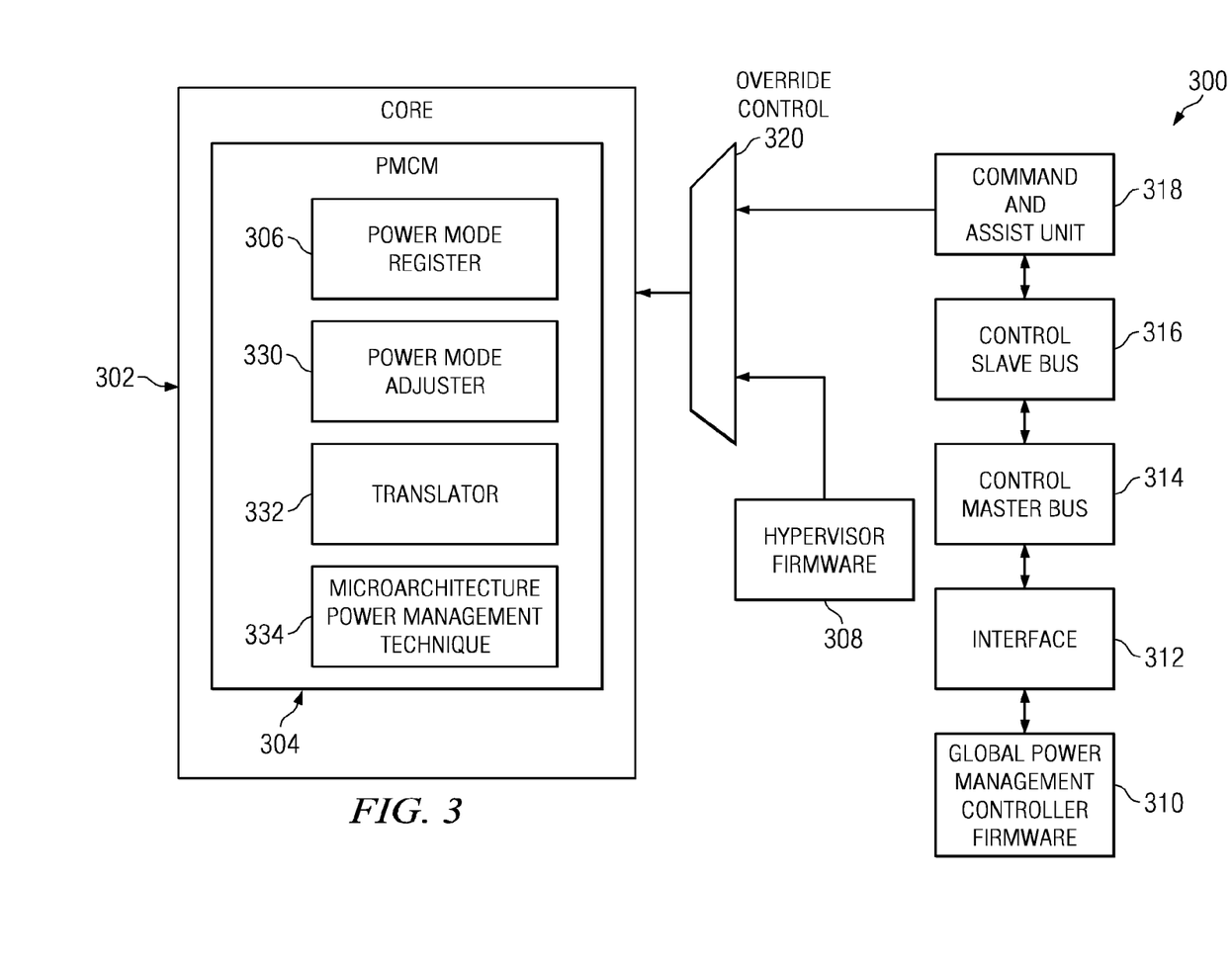
FIG. 3 is a block diagram of a power save mode control for a processor core in accordance with an illustrative embodiment.

FIG. 3 is a block diagram of a power save mode control for a processor core in accordance with an illustrative embodiment. System 300 comprises global power management controller 310, interface 312, control master bus 314, control slave bus 316, command and assist unit 318, hypervisor firmware 308, override control 320, and core 302. Global power management controller 310, interface 312, control master bus 314, control slave bus 316, and command and assist unit 318 may be implemented as global power management controller 204, interface 206, control master bus 208, control slave bus 230 of FIG. 2, respectively.

A hypervisor manages and enforces the partitioning and/or sharing of all the processor cores in a logically partitioned system. For example, a hypervisor may dispatch a virtual partition to one or more physical processor cores. The logical partition includes a definition of the work that each physical processor core is to perform as well as various required settings and state information within each physical processor core in order for the physical processor core to execute the work.

A hypervisor supervises and manages the sharing of each physical processor core among all of the logical partitions. Particular configuration data needed by a physical processor core to process that logical partition defines each logical partition. The configuration data includes particular data, register values, states, settings, and information. The hypervisor stores all of the configuration data in the hypervisor's memory. Firmware is code written onto read-only memory (ROM) or programmable read-only memory (PROM).

Core 302 comprises PMCM 304. PMCM 304 comprises one or more power mode registers, translators, power mode adjuster, and microarchitecture power management techniques, such as power mode register 306, translator 332, power mode adjuster 330, and microarchitecture power management techniques 334, respectively. Each power mode register with several power mode adjusters and translators connects to a microarchitectural power management in a functional unit in core 302 and provides a mode for the microarchitectural power management technique in that functional unit.

There are two ways or paths for the power mode register to receive a command. The first way is for global power management controller 310 to issue a command, which passes through interface 312 to control master bus 314 to control slave bus 316 and then to command and assist unit 318, which passes the command through override control 320 to power mode register 306. The second way is for hypervisor firmware 308 to issue a command, which passes through override control 320 to power mode register 306. Override control 320 allows global power management controller 310 to override hypervisor firmware 308 in the case of conflicting instructions.

Figure 4:
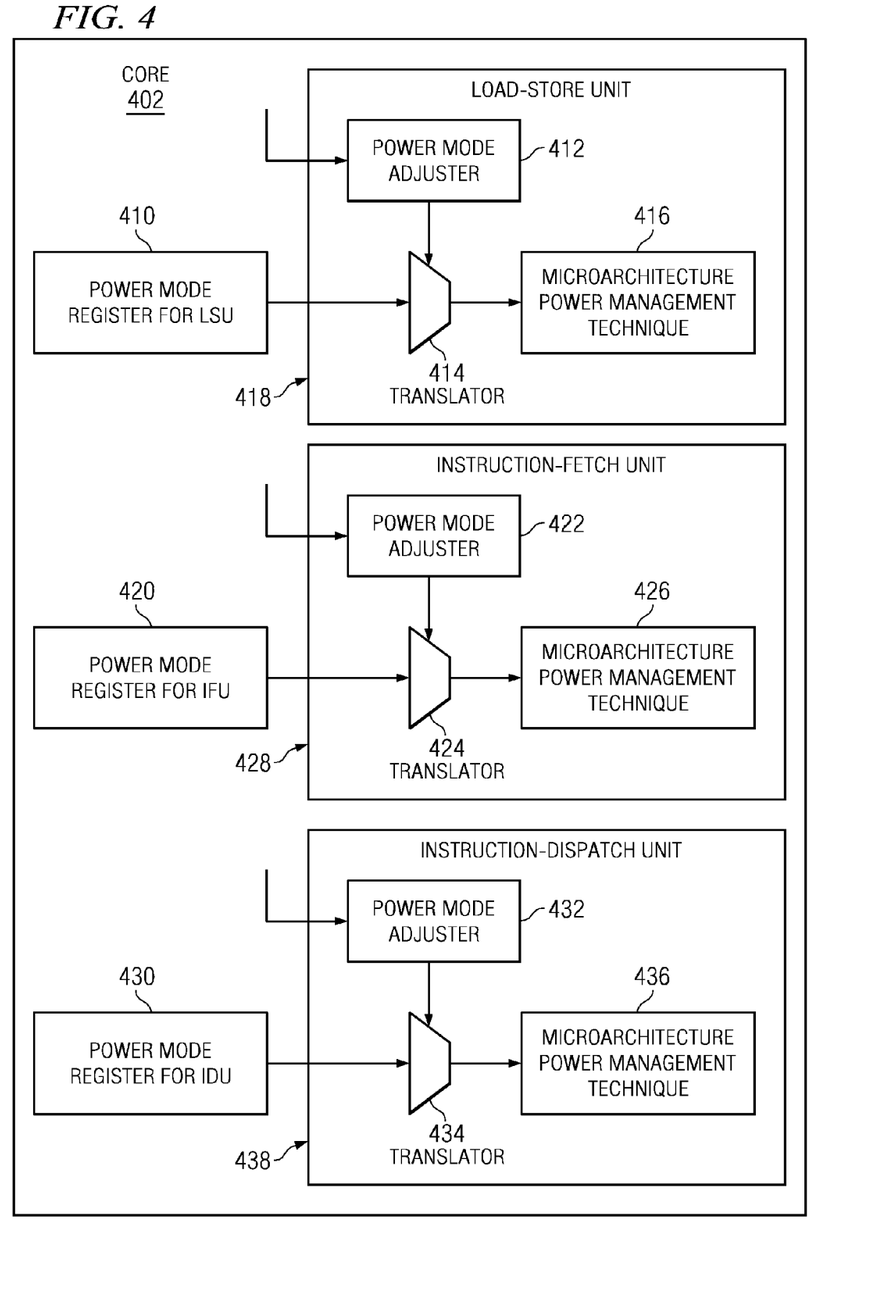
FIG. 4 is a block diagram of a power management control microarchitecture components in a processor core in accordance with an illustrative embodiment.

FIG. 4 is a block diagram of power management control microarchitecture components in a processor core in accordance with an illustrative embodiment. Core 402 may be implemented as core 302 in FIG. 3 and as part of chiplet 210 in FIG. 2. A core comprises any number of functional units, each of which connects to a power mode register. In the present example, core 402 comprises functional units load-store unit 418, instruction-fetch unit 428, instruction-dispatch unit 438, power mode registers, power mode register for LSU (load-store unit) 410, power mode register for IFU (instruction-fetch unit) 420, and power mode register for IDU (instruction-dispatch unit) 430.

Load-store unit 418 comprises power mode adjuster 412, translator 414, and microarchitecture power management technique 416. Translator 414 connects to and receives input from power mode adjuster 412 and power mode register for LSU 410. Translator 414 also connects to and provides input to microarchitecture power management technique 416.

Instruction-fetch unit 428 comprises power mode adjuster 422, translator 424, and microarchitecture power management technique 426. Translator 424 connects to and receives input from power mode adjuster 422 and power mode register for IFU 420. Translator 424 also connects to and provides input to microarchitecture power management technique 426.

Instruction-dispatch unit 438 comprises power mode adjuster 432, translator 434, and microarchitecture power management technique 436. Translator 434 connects to and receives input from power mode adjuster 432 and power mode register for IDU 430. Translator 434 also connects to and provides input to microarchitecture power management technique 436.

It should be noted that while each functional unit shown in FIG. 4 comprises a single combination of a power mode register, power mode adjuster, translator, and microarchitecture power management technique, each functional unit may contain any number of microarchitecture power management technique, each of which is connected to a power mode adjuster and translator connected to their own power mode register.

In an alternate embodiment, there is only a single power mode register for all the functional units in core 402. A programmer can set the power adjuster at the time of design. In an alternate embodiment, either hypervisor firmware, such as hypervisor firmware 308 of FIG. 3, or a global power management controller, such as global power management controller 310 in FIG. 3 can set the power mode adjuster.

Microarchitecture power management technique perform tasks such as, but not limited to, instruction fetch throttling, choosing how deep to prefetch, disabling speculation, power-efficient thread prioritization in a simultaneous multi-threaded processor, disabling bypass paths between instruction dispatch and issue, disabling issue of certain type of instructions to certain types of functional units, reducing execution modes such as reducing number of instructions that can be dispatched or committed, in-order issuing versus out-of-order issuing, reducing load miss speculation, and so forth.

Figure 5:
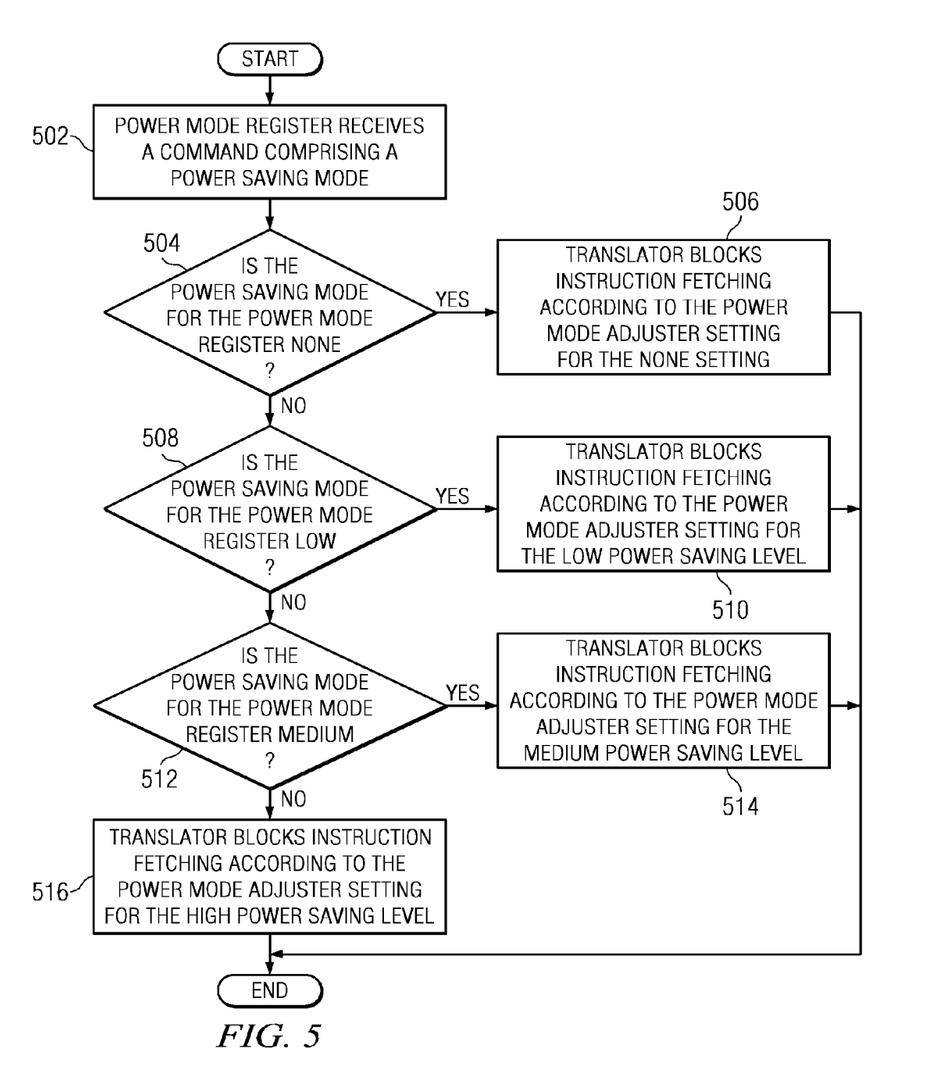
FIG. 5 is a flowchart illustrating an example of instruction fetch throttling in accordance with an illustrative embodiment.

FIG. 5 is a flowchart illustrating an example of instruction fetch throttling in accordance with an illustrative embodiment. The operation of FIG. 5 may be performed by a power management control microarchitecture, such as PMCM 304 in FIG. 3, which is a power management system for managing and controlling power on a microarchitectural level.

The flowchart assumes that the power mode register is a single two-bit register. The power mode adjuster comprises three three-bit registers. The translator is a simple multiplexer. Further, as the power mode register has two bits, four distinct power saving levels exist for the power mode register. The four modes are (i) none, which equals max performance with no power savings; (ii) low, which equals negligible performance loss across workloads with low power savings; (iii) medium, which equals some measurable performance loss with medium power savings; and (iv) high, which equals possibly large performance losses with large potential power savings.

In this specific example, for low, medium, and high power modes, there are three separate three-bit power mode adjusters that define what percent of the time to block instruction fetching. For a power saving level of none, there are no additional power adjustments. The three bits of the power adjuster are defined as follows:

000→never block instruction fetch
001→block instruction fetch 12 percent of the time
010→block instruction fetch 25 percent of the time
011→block instruction fetch 37 percent of the time
100→block instruction fetch 50 percent of the time
101→block instruction fetch 62 percent of the time 110→block instruction fetch 74 percent of the time
111→block instruction fetch 86 percent of the time The operation begins when a power mode register receives a command comprising a power saving mode (step 502). The translator determines whether the power saving mode for the power mode register is none (step 504). If the power savings mode for the power mode register is none (a "yes" output to step 504), the translator blocks instruction fetching according to the power mode adjuster setting for the none setting (step 506) and the operation ends. According to the present example, the translator makes no additional adjustments and the instruction fetch unit fetches the instruction as normal.

If the power savings mode for the power mode register is not none (a "no" output to step 504), the translator determines whether the power saving mode for the power mode register is low (step 508). If the power savings mode for the power mode register is low (a "yes" output to step 508), the translator blocks instruction fetching according to the power mode adjuster setting for the low power saving level (step 510) and the operation ends.

If the power savings mode for the power mode register is not low (a "no" output to step 508), the translator determines whether the power saving mode for the power mode register is medium (step 512). If the power savings mode for the power mode register is medium (a "yes" output to step 512), the translator blocks instruction fetching according to the power mode adjuster setting for the medium power saving level (step 514) and the operation ends.

If the power savings mode for the power mode register is not medium (a "no" output to step 512), the translator blocks instruction fetching according to the power mode adjuster setting for the high power saving level (step 516) and the operation ends.

Thus, referring to the example above, assume that the power mode adjuster for low is to "010", the power mode adjuster for medium is to "100", and the power mode adjuster for high is to "111." In such a case, the following situations occur. Under the low power saving mode, the translator blocks instruction fetching 25 percent of the time. Under the medium power saving mode, the translator blocks instruction fetching 50 percent of the time. Under the high power saving aggressiveness, the translator blocks instruction fetching 86 percent of the time.

Figure 6:
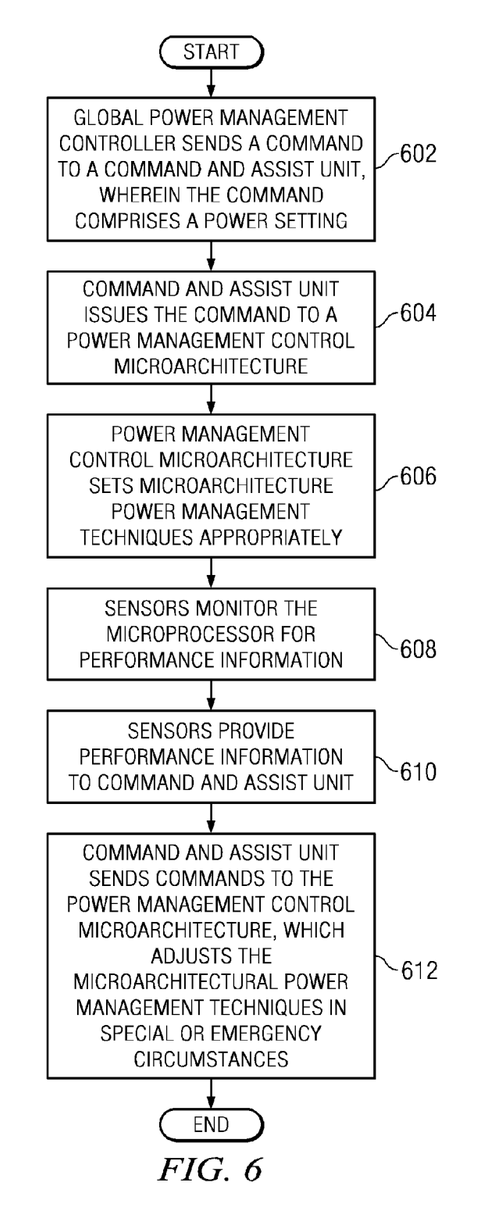
FIG. 6 is flowchart illustrating a single iteration of the operation of managing power in a multi-core processor in accordance with an exemplary embodiment.

FIG. 6 is flowchart illustrating one iteration of the operation of managing power in a multi-core processor in accordance with an exemplary embodiment. The operation begins when a global power management controller, which is a global, system-level power management controller, sends a command to a command and assist unit, wherein the command comprises a power setting (step 602). The command and assist unit issues the command to a power management control microarchitecture, which is a power management system for managing and controlling power on a microarchitectural level (step 604). Power management control microarchitecture sets microarchitectural power management techniques appropriately (step 606). Sensors monitor the microprocessor for performance information (step 608). Sensors provide performance information to command and assist unit (step 610). The command and assist unit sends commands to the power management control microarchitecture, which adjusts the microarchitectural power management techniques in special or emergency circumstances (step 612) and the process ends.

Figure 7:
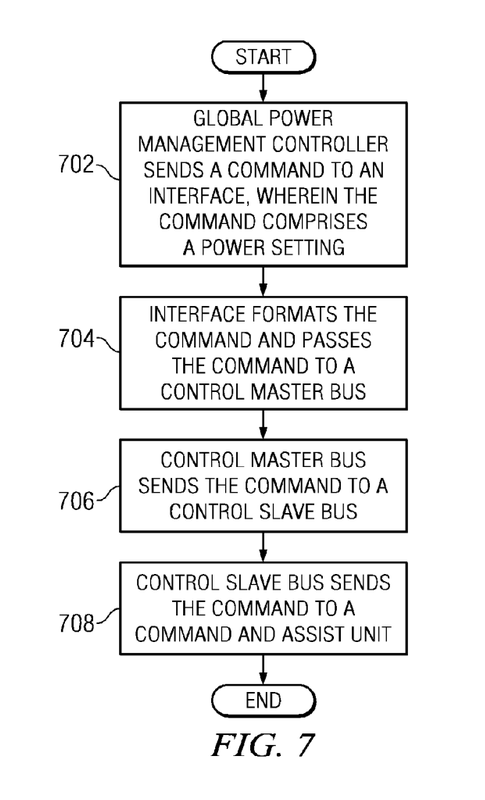
FIG. 7 is flowchart expanding the step of a global power management controller sending a command to a command and assist unit in accordance with a preferred embodiment.

FIG. 7 is flowchart expanding the step of a global power management controller sending a command to a command and assist unit in accordance with a preferred embodiment. The operation begins when a global power management controller sends a command to an interface, wherein the command comprises a power setting (step 702). The interface formats the command and passes the command to a control master bus (step 704). The control master bus sends the command to a control slave bus (step 706). The control slave bus sends the command to a command and assist unit (step 708) and the operation ends.

In an exemplary embodiment, the global power management controller sends commands to specific cores or chiplets within a multi-core microprocessor. Furthermore, each chiplet may be set to a different power savings mode. In an alternate embodiment, the global power management controller sends a general command for all the cores or chiplets in a multi-core microprocessor and the control slave bus breaks the command into sub-commands that correspond to the specific individual core or chiplets.

Figure 8:
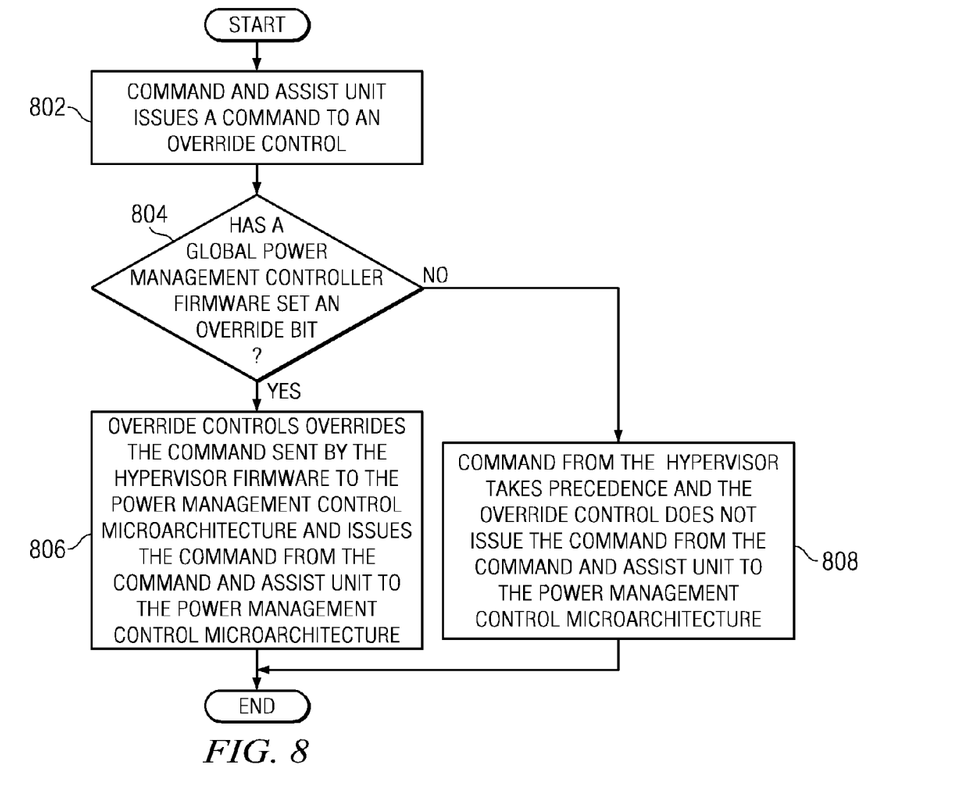
FIG. 8 is flowchart expanding the step of the command and assist unit issuing a command to a power management control microarchitecture in accordance with a preferred embodiment.

FIG. 8 is flowchart expanding the step of the command and assist unit issuing a command to a power management control microarchitecture in accordance with a preferred embodiment. The operation begins when a command and assist unit issues a command to an override control (step 802). The override control determines whether the global power management controller firmware has set an override bit (step 804).

Responsive to a determination by the override control that the global power management controller firmware has set the override bit (a "yes" output to step 804), the override controls overrides the command sent by the hypervisor firmware to the power management control microarchitecture and issues the command from the command and assist unit to the power management control microarchitecture (step 806) and the operation ends. Responsive to a determination by the override control that the global power management controller firmware has not set the override bit (a "no" output to step 804), the command from the hypervisor takes precedence and the override control does not issue the command from the command and assist unit to the power management control microarchitecture (step 808) and the operation ends.

Figure 9:
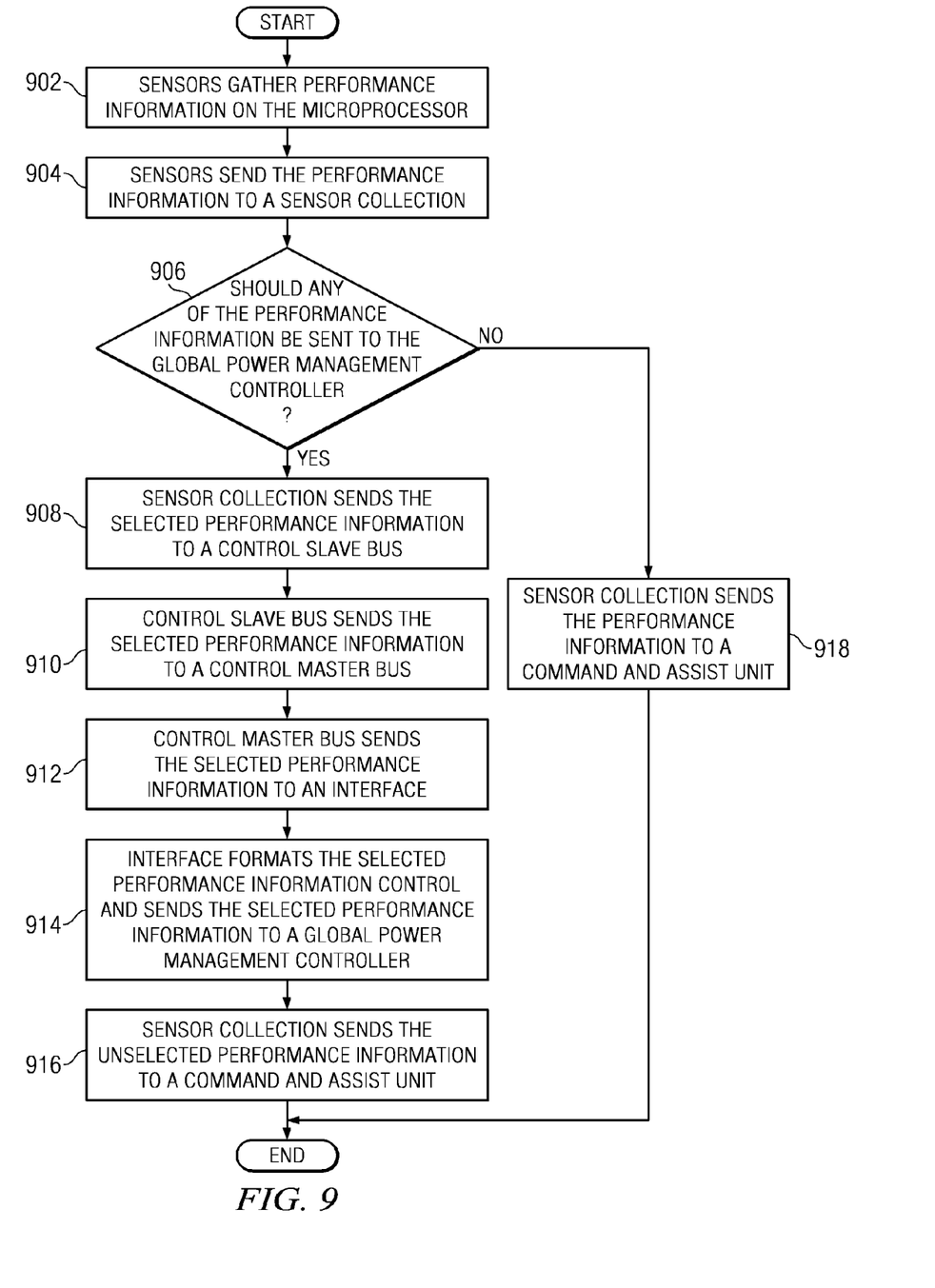
FIG. 9 is flowchart expanding the step of the sensors providing performance information to the command and assist unit in accordance with a preferred embodiment.

FIG. 9 is flowchart expanding the step of the sensors providing performance information to the command and assist unit in accordance with a preferred embodiment. The operation begins by the sensors gathering performance information on the microprocessor (step 902). The sensors send the performance information to a sensor collection (step 904). The sensor collection determines whether to send any of the performance information to the global power management controller (step 906).

Responsive to a determination by the sensor collection to send some or all of the performance information to the global power management controller (a "yes" output to step 906), the sensor collection sends the selected performance information to a control slave bus (step 908). The control slave bus sends the selected performance information to a control master bus (step 910). The control master bus sends the selected performance information to an interface (step 912). The interface formats the selected performance information control and sends the selected performance information to a global power management controller (step 914). The sensor collection sends the unselected performance information to a command and assist unit (step 916) and the operation ends.

Responsive to a determination by the sensor collection not to send any of the performance information to the global power management controller (a "no" output to step 906), the sensor collection sends the performance information to a command and assist unit (step 918) and the operation ends.

Figure 10:
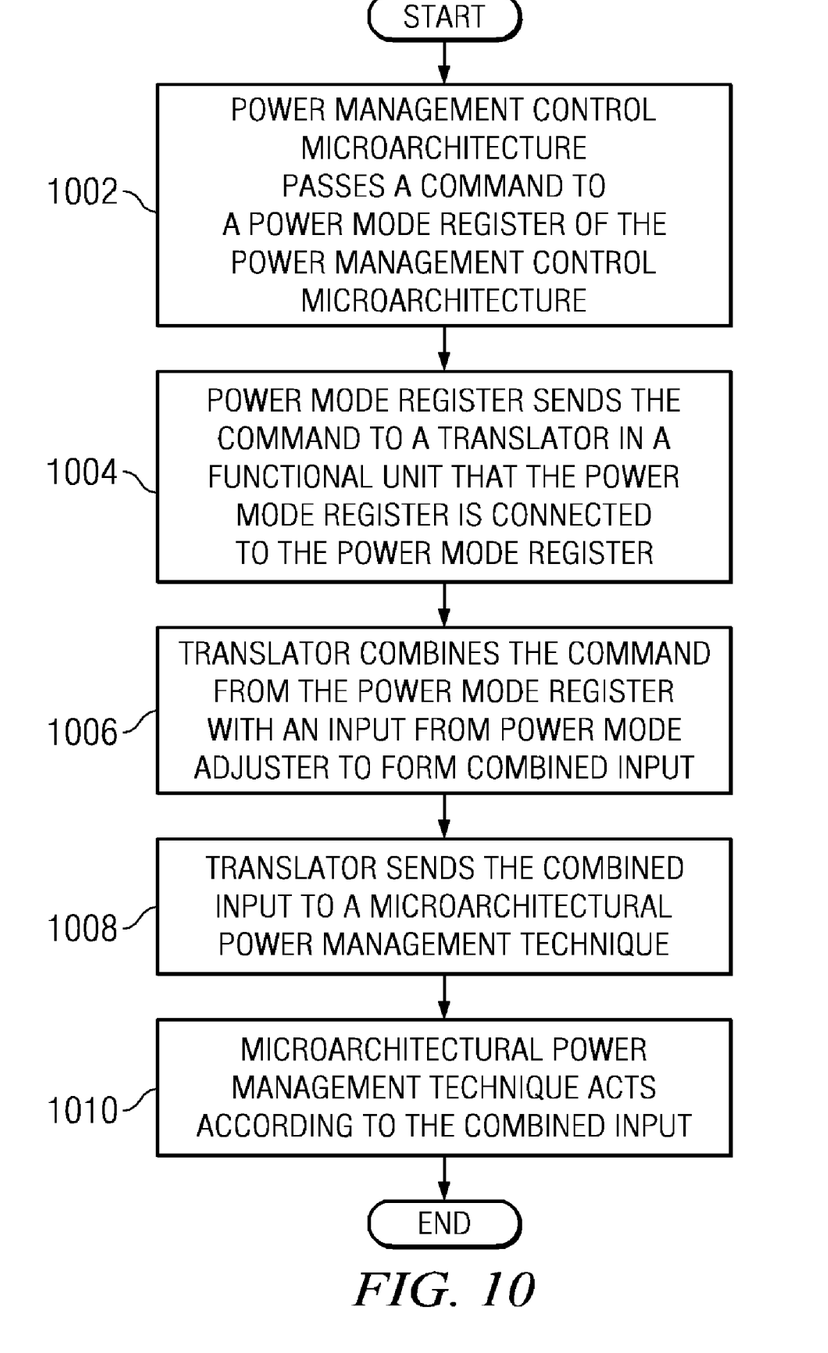
FIG. 10 is flowchart expanding the step of the power management control microarchitecture setting microarchitectural power management techniques in accordance with a preferred embodiment

FIG. 10 is flowchart expanding the step of the power management control microarchitecture setting microarchitectural power management techniques in accordance with a preferred embodiment. The operation begins by the power management control microarchitecture passes a command to a power mode register of the power management control microarchitecture (step 1002). The power mode register sends the command to a translator in a functional unit connected to the power mode register (step 1004). The translator combines the command from the power mode register with an input from power mode adjuster to form combined input (step 1006). The translator sends the combined input to a microarchitectural power management technique (step 1008). The microarchitectural power management technique acts according to the combined input (step 1010) and the operation ends.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, exemplary embodiments provide for a method and system for managing power in a multi-core processor environment. Exemplary embodiments enable placing each core within a multi-core microprocessor chip specific and possibly different operational modes, each mode with pre-defined power and performance characteristics, such that the overall chip power consumption falls within specified limits, as dictated by a chip-wide global controller, while not violating specified performance degradation limits. In particular, exemplary embodiments describe a systematic methodology with associated system embodiments for architecting a discrete set of power modes for each chiplet, which is a processor core plus some memory cache, which a global controller may use to effect programmable power management and control functions. The global controller may reside either on or off the microprocessor chip.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The description of the illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to explain best the principles of the illustrative embodiments, the practical application, and to enable others of ordinary skill in the art to understand the illustrative embodiments for various embodiments with various modifications as are suited to the particular use contemplated.

What is claimed is:

1. A computer-implemented method for managing power in a multi-core microprocessor, the computer-implemented method comprising:

translating a first command by a power management system for managing and controlling power on a microarchitectural level, wherein the first command comprises a power setting;

sending the first command, by a global, system-level power management controller, to a command and assist unit in a selected chiplet of a plurality of chiplets of the multi-core microprocessor, wherein a chiplet comprises a core and cache memory and wherein each chiplet of the plurality of chiplets may be set to a different power setting;

sending the first command, by the command and assist unit, to an override control unit;

determining, by the override control unit, whether a global, system-level power management controller firmware has set an override control bit;

responsive to a determination that the global, system-level power management controller firmware has set the override control bit, overriding a command from hypervisor firmware with the first command;

sending the first command to the power management system; and setting microarchitectural power management techniques by the power management system according to the power setting.

2. The computer-implemented method of claim 1, wherein sending the first command, by a global, system-level power management controller, to the command and assist unit in a selected chiplet of the multi-core microprocessor comprises:

sending the first command, by the global, system-level power management controller, to an interface;

responsive to the interface receiving the first command, formatting the first command, by the interface;

sending the first command, by the interface, to a master bus;

sending the first command, by the master bus, to a selected slave bus, wherein the selected slave bus communicates with each chiplet of the plurality of chiplets in the multi-core microprocessor;

selecting a chiplet out of the plurality chiplets in the multi-core microprocessor, by the selected slave bus, to which to send the first command; and sending the first command, by the selected slave bus, to the command and assist unit in the selected chiplet.

3. The computer-implemented method of claim 2, wherein the global, system-level power management controller sends commands directed to the plurality of chiplets within the multi-core microprocessor; and wherein the selected slave bus converts the first command into sub-commands dedicated to each individual chiplet in the plurality of chiplets in the multi-core microprocessor.

4. The computer-implemented method of claim 1, wherein the global, system-level power management controller resides off of the multi-core microprocessor.

5. The computer-implemented method of claim 1, further comprising:

monitoring, by sensors, the selected chiplet for performance information;

sending, by the sensors, the performance information to a sensor collection;

sending, by the sensor collection, the performance information to the command and assist unit; and responsive to receiving the performance information by the command and assists unit, sending a second command to a power management control microarchitecture, wherein the second command comprises adjustments to the power setting.

6. The computer-implemented method of claim 5, further comprising:

sending, by the sensor collection, a selected portion of the performance information to the global, system-level power management controller; and responsive to receiving, by the global, system-level power management controller, the selected portion of the performance information, processing the selected portion of the performance information.

7. The computer-implemented method of claim 1, wherein setting microarchitectural power management techniques by the power management system according to the power setting comprises:

passing the first command, by the power management system, to a first register;

sending the first command, by a first register located within the selected chiplet, wherein the first register is dedicated to assigning power levels, to a functional unit of the selected chiplet to which the first register is connected;

receiving the first command by a translator in the functional unit;

responsive to receiving the first command, combining, by the translator, the first command with an input from a set of registers located in the functional unit of the selected chiplet, wherein the set of registers are dedicated to adjusting the power levels in the first register to form a combined input;

sending, by the translator, the combined input to a microarchitectural power management technique in the functional unit; and responsive to receiving the combined input by the microarchitectural power management technique, processing the combined input.

8. The computer-implemented method of claim 7, wherein the global, system-level power management controller sets the set of registers.

9. A system for managing power in a multi-core microprocessor, the system comprising:

global, system-level power management controller firmware;

hypervisor firmware;

an override control unit;

a power management system for managing and controlling power on a microarchitectural level, wherein the power management system translates a first command and wherein the first command comprises a power setting;

a plurality of chiplets in the multi-core microprocessor, wherein a selected chiplet of the processor core and cache memory and wherein each chiplet of the plurality of chiplets may be set to a different power setting;

a command and assist unit in the selected chiplet, wherein the command and assist unit sends the first command to the override control unit;

the override control unit determining whether the global, system-level power management controller firmware has set an override control bit;

responsive to a determination that the global, system-level power management controller firmware has set the override control bit, the override control unit overrides a command from the hypervisor firmware with the first command;

the override control unit sends the first command to the power management system;

a global, system-level power management controller, wherein the global, system-level power management controller sends the first command to the command and assist unit; and a microarchitectural power management technique, wherein the power management system sets the microarchitectural power management technique according to the power setting.

10. The system of claim 9, further comprising:

a selected slave bus connected to the plurality of chiplets, wherein the slave bus communicates with each chiplet of the plurality of chiplets in the multi-core microprocessor;

a master bus connected to the slave bus;

an interface connected to the master bus and the global, system-level power management controller; and wherein the global, system-level power management controller sending the first command to the command and assist unit in a selected chiplet of the multi-core microprocessor comprises:

the global, system-level power management controller sending the first command to the interface;

responsive to the interface receiving the first command, the interface formats the first command;

the interface sends the first command to the master bus;

the master bus sends the first command to the selected slave bus;

the selected slave bus selects a chiplet out of the plurality chiplets in the multi-core microprocessor to which to send the first command; and the selected slave bus sends the first command to the command and assist unit in the selected chiplet.

11. The system of claim 10, wherein the global, system-level power management controller sends commands directed to the plurality of chiplets within the multi-core microprocessor; and wherein the selected slave bus converts the first command into sub-commands dedicated to each individual chiplet in the plurality of chiplets in the multi-core microprocessor.

12. The system of claim 9, wherein the global, system-level power management controller resides off of the multi-core microprocessor.

13. The system of claim 9, further comprising:

sensors for monitoring the selected chiplet for performance information;

a sensor collection, wherein the sensors send the performance information to the sensor collection, and wherein the sensor collection sends the performance information to the command and assist unit; and responsive to receiving the performance information by the command and assists unit, sending a second command to a power management control microarchitecture, wherein the second command comprises adjustments to the power setting.

14. The system of claim 13, further comprising:

the sensor collection sending a selected portion of the performance information to the global, system-level power management controller; and responsive to receiving, the selected portion of the performance information, the global, system-level power management controller processes the selected portion of the performance information.

15. The system of claim 9, further comprising
a first register, wherein the first register is located within the selected chiplet and wherein the first register is dedicated to assigning power levels;
a functional unit connected to the first register, wherein the functional unit comprises:
a translator;
a set of registers, wherein the set of registers are dedicated to adjusting the power levels in the first register; and
wherein the power management system setting the microarchitectural power management technique according to the power setting comprises:
the power management system passing the first command to the first register;
the first register sending the first command to the functional unit;
the translator in the functional unit receives the first command;
responsive to receiving the first command, the translator combines the first command with an input from the set of registers to form a combined input;
the translator sends the combined input to the microarchitectural power management technique; and
responsive to receiving the combined input, the microarchitectural power management technique processes the combined input.

16. The system of claim 15, wherein the global, system-level power management controller sets the set of registers.

* * * * *